US012746439B2

(12) United States Patent
Hoffman et al.

(10) Patent No.: US 12,746,439 B2
(45) Date of Patent: Sep. 29, 2026

(54) LOCATION-BASED FUNCTION CONTROL FOR A VEHICLE

(71) Applicant: Textron Inc., Providence, RI (US)

(72) Inventors: Nicholas Alexander Hoffman, North Augusta, SC (US); Brianna Danielle Harrington, Augusta, GA (US); Matthew Jacob Noftsger, Evans, GA (US)

(73) Assignee: Textron Innovations LLC, Providence, RI (US)

( * ) Notice: Subject to any disclaimer, the term of this patent is extended or adjusted under 35 U.S.C. 154(b) by 60 days.

(21) Appl. No.: 18/731,846

(22) Filed: Jun. 3, 2024

(65) Prior Publication Data

US 2025/0367520 A1 Dec. 4, 2025

(51) Int. Cl.
*A63B 55/60* (2015.01)
*G06F 3/16* (2006.01)
*H05B 47/17* (2020.01)

(52) U.S. Cl.
CPC ............. *A63B 55/61* (2015.10); *H05B 47/17* (2020.01); *G06F 3/165* (2013.01)

(58) Field of Classification Search
CPC .......... A63B 55/61; H05B 47/17; G06F 3/165
See application file for complete search history.

(56) References Cited

U.S. PATENT DOCUMENTS

| | | | |
|---|---|---|---|
| 8,581,713 | B1 | 11/2013 | Morgan et al. |
| 8,965,406 | B2 | 2/2015 | Henderson |
| 9,307,359 | B2 | 4/2016 | Cheung |
| 9,602,970 | B1 | 3/2017 | Mahapatra |
| 9,872,139 | B2 | 1/2018 | Baran et al. |
| 9,913,088 | B2 | 3/2018 | Fei et al. |
| 10,057,714 | B2 | 8/2018 | Cali et al. |
| 10,433,107 | B1 | 10/2019 | Zhao et al. |
| 10,448,196 | B2 | 10/2019 | Kern et al. |
| 10,469,983 | B2 | 11/2019 | Jernigan |
| 10,481,857 | B2 | 11/2019 | Edwards |
| 10,841,731 | B2 | 11/2020 | Parab et al. |
| 10,896,441 | B2 | 1/2021 | Porter et al. |
| 11,039,239 | B2 | 6/2021 | Kamstrup |
| 11,039,273 | B1 | 6/2021 | Dym et al. |
| 11,070,940 | B2 | 7/2021 | Merjanian et al. |
| 11,158,175 | B2 | 10/2021 | Branscomb et al. |
| 11,190,901 | B1 | 11/2021 | Makkiya et al. |
| 11,281,992 | B2 | 3/2022 | Deluca et al. |

(Continued)

*Primary Examiner* — Anne Marie Antonucci
*Assistant Examiner* — Nicholas Patrick Langhorne
(74) *Attorney, Agent, or Firm* — Foley & Lardner LLP

(57) ABSTRACT

A golf vehicle system includes a golf vehicle including an auxiliary system. The golf vehicle system further includes at least one processing circuit configured to: detect that the golf vehicle is in proximity to a location of interest associated with an automated modification of a function of the auxiliary system from a first state to a second state; determine whether an automated modification exemption applies to the golf vehicle for the location of interest; upon determining that the automated modification exemption applies to the golf vehicle, maintain the function of the auxiliary system in the first state; and, upon determining that the automated modification exemption does not apply to the golf vehicle, modify the function of the auxiliary system from the first state to the second state.

15 Claims, 4 Drawing Sheets

(56) References Cited

U.S. PATENT DOCUMENTS

| | | | | |
|---|---|---|---|---|
| 11,564,055 | B2 | 1/2023 | Jones | |
| 11,830,366 | B2 | 11/2023 | Ren et al. | |
| 11,870,861 | B2 | 1/2024 | Jones | |
| 11,871,296 | B2 | 1/2024 | Jones et al. | |
| 2003/0060938 | A1 | 3/2003 | Duvall | |
| 2009/0140886 | A1 | 6/2009 | Bender | |
| 2010/0042940 | A1 | 2/2010 | Monday et al. | |
| 2012/0172027 | A1 | 7/2012 | Partheesh et al. | |
| 2013/0079028 | A1 | 3/2013 | Klein | |
| 2014/0066101 | A1 | 3/2014 | Lyman et al. | |
| 2014/0292511 | A1 | 10/2014 | Sheha et al. | |
| 2015/0148061 | A1 | 5/2015 | Koukoumideis et al. | |
| 2015/0281886 | A1 | 10/2015 | Steiner | |
| 2015/0327014 | A1 | 11/2015 | Hugie et al. | |
| 2016/0061609 | A1 | 3/2016 | Dickey et al. | |
| 2016/0094944 | A1 | 3/2016 | Kong et al. | |
| 2016/0135005 | A1 | 5/2016 | Saha et al. | |
| 2017/0273159 | A1* | 9/2017 | Akselrod | B60Q 1/143 |
| 2018/0076783 | A1* | 3/2018 | Clary | B60Q 5/005 |
| 2018/0101998 | A1* | 4/2018 | Pierce | G06F 16/24565 |
| 2018/0121956 | A1 | 5/2018 | Deluca et al. | |
| 2019/0090084 | A1 | 3/2019 | Jacobs et al. | |
| 2019/0129682 | A1* | 5/2019 | Edwards | H04R 3/00 |
| 2019/0164408 | A1 | 5/2019 | Bender et al. | |
| 2019/0200162 | A1 | 6/2019 | Cornwall et al. | |
| 2019/0253835 | A1 | 8/2019 | Jones | |
| 2019/0364381 | A1 | 11/2019 | Weston et al. | |
| 2019/0381665 | A1* | 12/2019 | Storr | G06Q 10/0631 |
| 2020/0296538 | A1 | 9/2020 | Jones | |
| 2020/0404449 | A1 | 12/2020 | Benjamin et al. | |
| 2021/0042335 | A1 | 2/2021 | Jones | |
| 2021/0243551 | A1 | 8/2021 | Jones | |
| 2021/0264792 | A1* | 8/2021 | Ren | G08G 1/207 |
| 2022/0044533 | A1 | 2/2022 | Branscomb et al. | |
| 2022/0312148 | A1 | 9/2022 | Zucker | |
| 2022/0377494 | A1 | 11/2022 | Jones | |
| 2023/0053257 | A1 | 2/2023 | Jones | |
| 2023/0262414 | A1 | 8/2023 | Jones | |
| 2025/0206303 | A1* | 6/2025 | Glissmeyer | H04W 4/025 |

* cited by examiner

LOCATION-BASED FUNCTION CONTROL FOR A VEHICLE

BACKGROUND

Off-road machines or vehicles are used in various scenarios for a variety of purposes. For example, all-terrain vehicles ("ATVs") and utility task vehicles ("UTVs") may be used for off-road exploration or performing a variety of tasks requiring off-road capabilities. Other lightweight or recreational machines (e.g., golf carts, lawnmowers, other chore products) can be used in a variety of other contexts to perform specific chores or to make travel between different locations more convenient.

Off-road machines or vehicles may be equipped with various systems and functionality. For example, off-road machines or vehicles may be equipped with an audio system for listening to music or other audible media. In some instances, off-road machines or vehicles may additionally or alternatively be equipped with enhanced lighting systems or functionality for providing enhanced lighting (e.g., compared to traditional headlights).

SUMMARY

One embodiment relates to a golf vehicle system. The golf vehicle system includes a golf vehicle including an auxiliary system. The golf vehicle system further includes at least one processing circuit having at least one processor and at least one memory. The at least one memory stores instructions thereon that, when executed by the at least one processor, cause the at least one processor to detect that the golf vehicle is in proximity to a location of interest associated with an automated modification of a function of the auxiliary system from a first state to a second state. The instructions, when executed by the at least one processor, further cause the at least one processor to determine whether an automated modification exemption applies to the golf vehicle for the location of interest. The instructions, when executed by the at least one processor, further cause the at least one processor to, upon determining that the automated modification exemption applies to the golf vehicle, maintain the function of the auxiliary system in the first state. The instructions, when executed by the at least one processor, further cause the at least one processor to, upon determining that the automated modification exemption does not apply to the golf vehicle, modify the function of the auxiliary system from the first state to the second state.

Another embodiment relates to a vehicle system. The vehicle system includes at least one processing circuit having at least one processor and at least one memory. The at least one memory stores instructions thereon that, when executed by the at least one processor, cause the at least one processor to: detect that a first vehicle is in proximity to a second vehicle; determine that the first vehicle qualifies for an automated modification of a function of the first vehicle from a first state to a second state based on detecting that the first vehicle is in proximity to the second vehicle; determine whether an automated modification exemption applies to the first vehicle for the second vehicle; upon determining that the automated modification exemption applies to the first vehicle, maintain the function of in the first state; and upon determining that the automated modification exemption does not apply to the first vehicle, modify the function from the first state to the second state.

Still another embodiment relates to a vehicle system. The vehicle system includes a non-transitory computer-readable medium having instructions stored thereon that, when executed by one or more processors, cause the one or more processors to: detect that a golf vehicle is in proximity to a location of interest associated with an automated modification of a function of the golf vehicle from a first state to a second state; determine whether an automated modification exemption applies to the golf vehicle for the location of interest; upon determining that the automated modification exemption applies to the golf vehicle, maintain the function in the first state; and upon determining that the automated modification exemption does not apply to the golf vehicle, modify the function from the first state to the second state.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
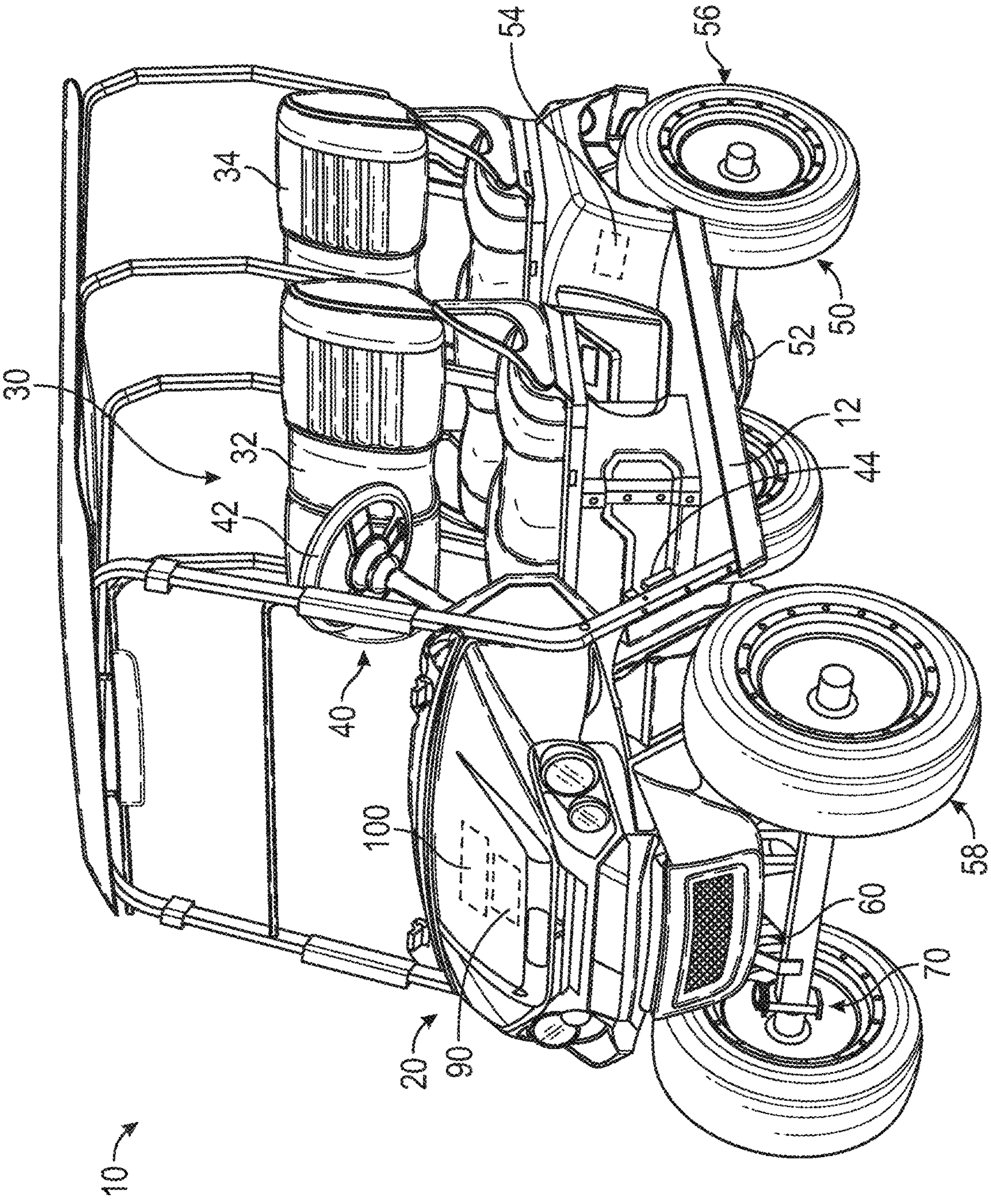
FIG. 1 is a perspective view of a vehicle, according to an exemplary embodiment.
Figure 2:
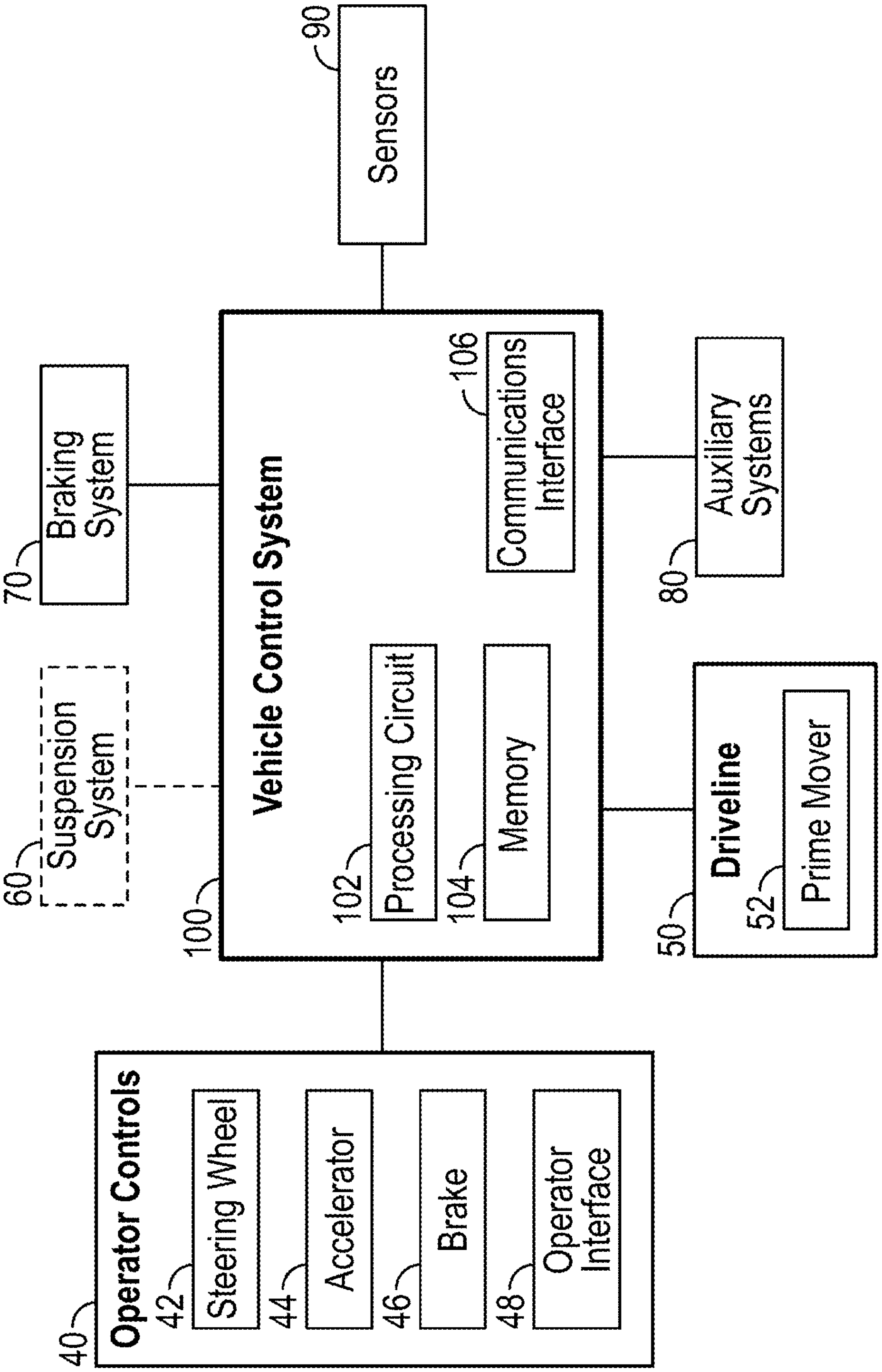
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more auxiliary systems, shown as auxiliary systems 80, configured to perform one or more auxiliary functions of the vehicle 10; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low-speed vehicle ("LSV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc. In some embodiments, the operator interface 48 is configured to enable a user or operator to enable, adjust, modify, or otherwise interact with one or more auxiliary systems (e.g., the auxiliary systems 80) of the vehicle 10.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

According to an exemplary embodiment, the auxiliary systems 80 include one or more of an audio system, an enhanced lighting system (e.g., a high-beam system), or any other auxiliary system configured to perform an auxiliary function for the vehicle 10. For example, in some embodiments, the auxiliary systems 80 include an audio system having one or more speakers or other audio devices and configured to allow a user or operator to play music or other audio media during operation of the vehicle 10 (e.g., via a wired or wireless connection with a mobile device of the user or operator). In some embodiments, the auxiliary systems 80 include an enhanced lighting system having one or more lights (e.g., high-beam headlights) configured to be selectively activated to provide enhanced lighting (e.g., higher-intensity lighting) as compared to a standard lighting system of the vehicle 10.

The sensors 90 may include various sensors positioned about the vehicle 10 to acquire vehicle information or vehicle data regarding operation of the vehicle 10, the location thereof, and/or the relative position between the vehicle 10 and other vehicles. By way of example, the sensors 90 may include one or more of the following: an accelerometer, a gyroscope, a compass, a position sensor (e.g., a GPS sensor, etc.), a communication radio (e.g., a Bluetooth transceiver, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, relative position of the vehicle 10 to other vehicles, whether the vehicle 10 is approaching another vehicle, vibrations experienced by the vehicle 10, sounds proximate the vehicle 10, suspension travel of components of the suspension system 60, and/or other vehicle telemetry data. For example, in some instances, Bluetooth sensor data (e.g., captured or otherwise monitored by a Bluetooth-based communication radio) can be used for Bluetooth-based distance estimation. That is, the distance between two Bluetooth-based communication radios (e.g., one on the vehicle 10 and another on another vehicle) can be estimated based on how much a signal amplitude between the two devices has increased or decreased. This data can then be used to infer or otherwise detect that the vehicle 10 is approaching the other vehicle and/or the two vehicles relative proximity.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
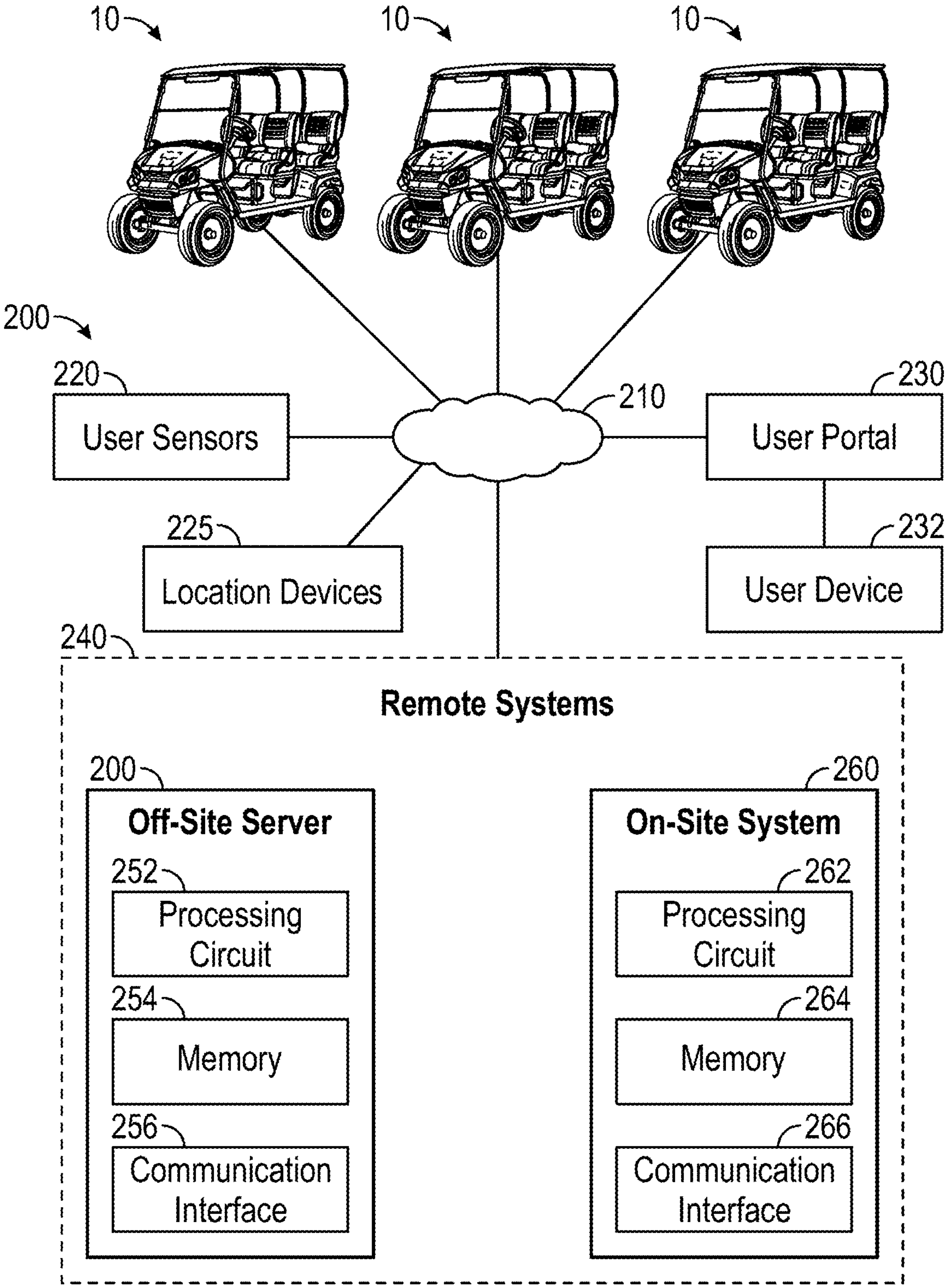
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; one or more location devices, shown as location devices 225, positioned at one or more locations of interest; an operator interface, shown as user portal 230, positioned remote or separate from the vehicles 10; an external or remote user device, shown as user device 232, positioned remote or separate from the vehicles 10 and one or more external processing systems, shown as remote systems 240, positioned remote or separate from the vehicles 10. The vehicles 10, the user sensors 220, the location devices 225, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The location devices 225 may be or include one or more short-range communication devices that are placed in or at one or more locations of interest to allow for detection of the location devices 225 by the vehicle 10 when the vehicle 10 is in proximity to the one or more locations of interest. By way of example, the location devices 225 may include one or more processing circuits configured to enable short-range communication functionality, such as Bluetooth communication, Wi-Fi communication, near-field communication (NFC), ultra-wideband (UWB) communication, and/or any other suitable short-range communication functionality. In some embodiments, the location devices 225 are further configured to communicate with the vehicle 10, the user device 232, and/or the remote systems 240 via the communications network 210.

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Location-Based Auxiliary Function Control

Figure 4:
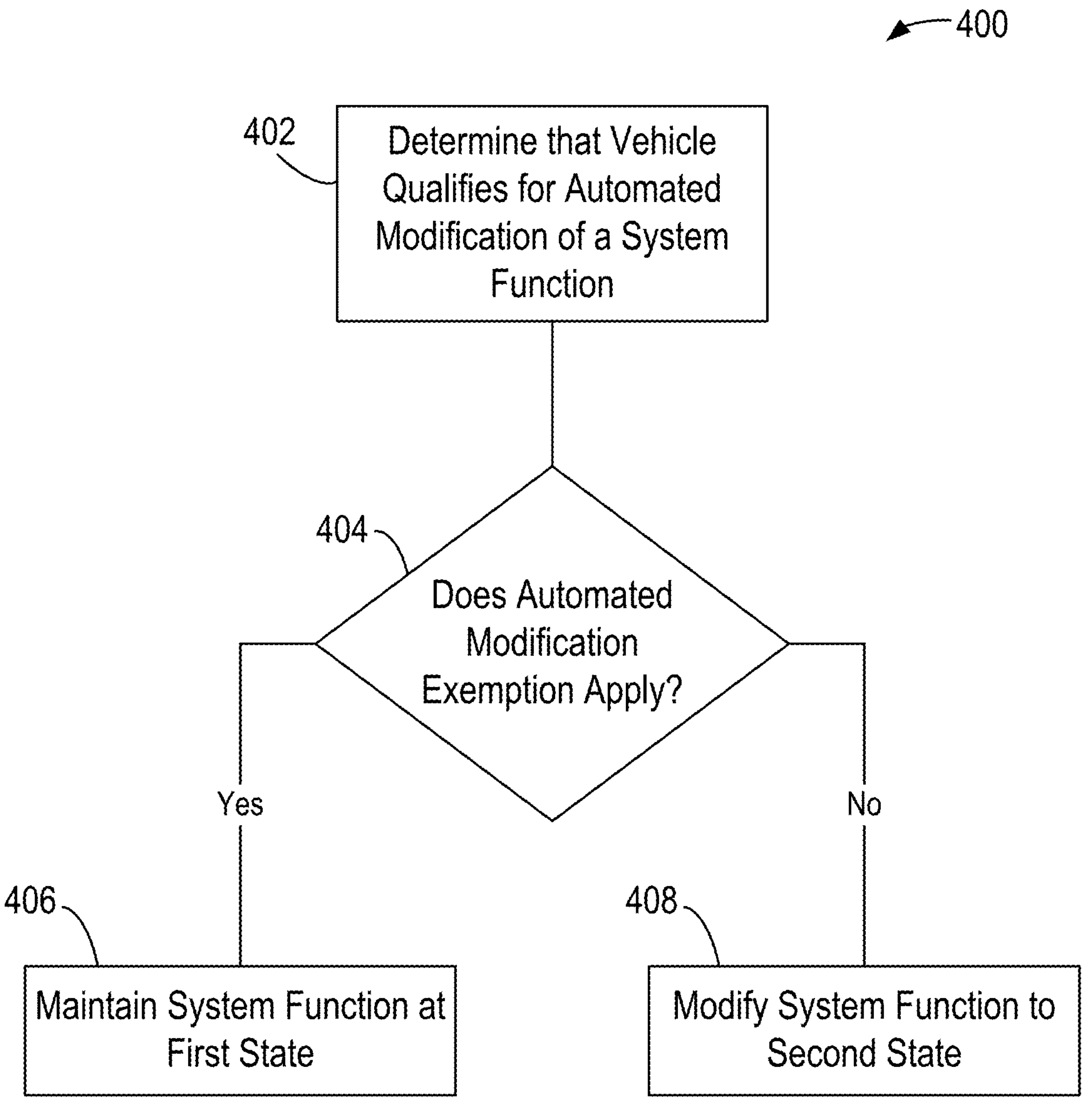
FIG. 4 is a flowchart of a method for selectively applying an automated function modification to a system of a vehicle, according to an exemplary embodiment.

Referring now to FIG. 4, a method 400 for selectively applying an automated function modification to a system (e.g., the auxiliary system 80, the driveline 50, etc.) of a vehicle (e.g., the vehicle 10) is provided below. It should be appreciated that the following description is provided as an example and is in no way meant to be limiting. Furthermore, it should be appreciated that, in some embodiments, various steps may be added, omitted, and/or rearranged within the method 400 without departing from the scope of the present disclosure. In some embodiments, the method 400 is performed by the vehicle control system 100. In other embodiments, the method 400 is performed by one of the remote systems 240 (e.g., the off-site server 250 or the on-site system 260) or another cloud-based server configured to provide control commands to the vehicle 10. In some embodiments, the method 400 is performed by a combination of the vehicle control system 100 and the remote systems 240.

As a general overview, the method 400 allows for the vehicle control system 100 and/or the remote systems 240 to determine that the vehicle 10 qualifies for an automated modification of an auxiliary system function (e.g., automatically reducing the volume of an audio system based on the vehicle 10 approaching another vehicle, automatically switching from high-beam to low-beam headlights, automatically reducing vehicle speed, etc.), determine whether an auxiliary function exemption applies (e.g., the vehicle 10 being linked in a social group with the vehicle being approached), and selectively apply the automated modification based on whether the auxiliary function exemption applies. It should be appreciated that, while the method 400 is described in the context of certain components of the vehicle 10, the vehicle control system 100 and/or the remote systems 240 can receive and utilize the same or other data types to perform the steps of the method 400 in a similar manner.

The method 400 begins with the vehicle control system 100 and/or the remote systems 240 (e.g., via the communications network 210) determining that the vehicle 10 qualifies for an automated modification of a system function, at step 402. For example, in some embodiments, the vehicle control system 100 and/or the remote systems 240 may determine that the vehicle 10 qualifies for an automated modification of a function of a system of the vehicle 10 (e.g., the auxiliary system 80, the driveline 50, etc.) in response to detecting that the vehicle 10 is in proximity to a location of interest.

The automated modification may be an automated adjustment of an output volume of an audio system, an automated adjustment of a brightness of an enhanced lighting system, an automated adjustment of a vehicle speed, or any other type of automated functionality adjustment that is capable of being made by the vehicle control system 100 and/or the remote systems 240. In some embodiments, the location of interest may be a stationary or static location, such as a tee box, a golf green, a club house, an out-of-bounds zone, a school zone, a residential area, a particular neighborhood, or any other location of interest or condition-sensitive area selected or set by a user. In some embodiments, the location of interest may be mobile or dynamic location (e.g., a location of the vehicle 10).

In some embodiments, a user may select or set one or more locations of interest and/or automated modification rules locally onboard the vehicle 10 via the operator interface 48. In other embodiments, a user (e.g., a vehicle fleet administrator) may select or set the locations of interest and/or the automated modification rules for the vehicle 10 (or for fleet of vehicles similar to the vehicle 10) remotely via the user portal 230, the user device 232, and/or one of the remote systems 240.

As one example, the user may select or set the locations of interest on a map (e.g., a map of a golf course, a map of a neighborhood, a map of a city) displayed to the user via a user interface (e.g., via the user portal 230, the user device 232, and/or one of the remote systems 240) by creating one or more zones or geofences around intended locations of interest using the user interface. In some embodiments, the user may create a zone or geofence via the user interface by drawing a boundary on the map around an intended location of interest or by selecting an intended location of interest (e.g., other vehicles within a fleet of vehicles) and setting a predetermined distance from the intended location of interest (e.g., ten feet, twenty feet, thirty feet, etc.). In these embodiments, the vehicle control system 100 and/or the remote systems 240 may determine that the vehicle 10 is in proximity to a location of interest (and thus that the vehicle 10 qualifies for the automated modification) based on GPS data of the vehicle 10 indicating that the vehicle 10 has entered the corresponding zone or geofence associated with the location of interest.

In some embodiments, the user may additionally or alternatively select or set the locations of interest by selecting locations of interest having associated detectable communication devices (e.g., a location device 225 placed at a location of interest, a communication device of another vehicle similar to the communications interface 106 of the vehicle 10, etc.) via a map or a selectable list on the user interface. In these embodiments, the vehicle control system 100 and/or the remote systems 240 may determine that the vehicle 10 is in proximity to a location of interest based on a short-range wireless communication (e.g., Bluetooth, Wi-Fi, NFC, UWB, etc.) between the vehicle 10 and the detectable communication device associated with the location of interest. For example, in some embodiments, the vehicle control system 100 is configured to detect a short-range wireless communication received from a detectable communication device of a location of interest via the communications interface 106. In some embodiments, the vehicle control system 100 is further configured to relay an indication of this detection to the remote systems 240 (e.g., via the communications network 210).

In some embodiments, the user may similarly set or select one or more automated modification rules for each location of interest via the user interface. For example, the user may specify that, for a given location of interest, an output volume of an audio system should be automatically reduced from a first volume level to a second volume level, or that the output volume should be muted (e.g., to preserve a desired environment or to enforce etiquette rules on a golf course). In some embodiments, the user may specify that, for a given location of interest, a light intensity of an enhanced lighting system should be reduced from a first light intensity level to a second light intensity level, or that the lights should be turned completely off (e.g., upon approaching another vehicle). In some embodiments, the user may specify that, for a given location of interest, a speed of the vehicle 10 should be reduced to or below a speed threshold (e.g., upon approaching another vehicle, approaching a tee box, approaching a clubhouse, etc.).

It should be appreciated that these rules are provided as examples, and, in other scenarios other types of automated functionality modifications can be made based on proximity to a given location of interest or in response to other events or conditions generally, as desired for a given application.

As an example, in some embodiments, the user may set various automated modification rules that are triggered upon detection of inappropriate or otherwise pre-defined driving behaviors of the vehicle 10. For example, in addition to GPS data associated with the vehicle 10, the vehicle control system 100 and/or the remote systems 240 may also receive and monitor IMU data and/or motor data captured by one or more of the sensors 90 to track vehicle speed, vehicle cornering, vehicle acceleration, etc., of the vehicle 10 during operation. Accordingly, the user may set various automated modification rules that are triggered based on, for example, the vehicle 10 being driven over a speed limit set for a given area, the vehicle 10 accelerating too quickly, the vehicle 10 making sharp turns, the vehicle 10 driving in reverse, the vehicle 10 generally driving within a given area or zone (e.g., an out-of-bounds zone), etc. As an example, the user may set a rule to reduce a maximum volume of the audio system while any of the aforementioned driving behaviors are detected.

In some embodiments, the locations of interest and/or the automated modification rules may be transmitted to, stored by, and/or applied to the vehicle 10 locally by the vehicle control system 100. Local storage and performance of the automated modification rules (e.g., by the vehicle control system 100) may beneficially improve responsivity and/or reliability of the vehicle 10 to the automated modification rules as compared to remote storage and performance (e.g., by the remote systems 240) by eliminating the need for an active or real-time communication connection between the vehicle control system 100 and the remote systems 240 during operation of the vehicle 10. That is, when applied locally, the vehicle control system 100 can apply stored automated modification rules (e.g., provided locally via the operator interface 48 or remotely via the user portal 230, the user device 232, and/or one of the remote systems 240) during operation of the vehicle 10 without communicating in real-time with the remote systems 240. Further, by having each vehicle in a fleet of vehicles receive, store, and apply the automated modification rules, the remote systems 240 does not need to simultaneously and continuously monitor and control multiple vehicles (e.g., similar to the vehicle 10), thereby reducing a computation burden on the remote systems 240. However, in some other embodiments, the locations of interest and/or the automated modification rules may be transmitted to, stored by, and/or applied to each vehicle in a fleet of vehicles remotely by the remote systems 240.

Once the vehicle control system 100 and/or the remote systems 240 determine that the vehicle 10 qualifies for the automated modification, at step 402, the vehicle controller 100 and/or the remote systems 240 then determine whether an automated modification exemption applies, at step 404. For example, a user (e.g., a vehicle fleet administrator) may additionally set one or more automated modification exemptions that allow for certain automated modification rules to be ignored or otherwise not applied to the vehicle 10 if certain exemption criteria are met.

In some embodiments, an automated modification exemption may be applied between an identified group of vehicles. That is, the automated modification exemption may specify that certain automated modification rules that are generally applicable to vehicles outside of an identified group (e.g., a social group, a group of friends, a golf event, etc.) will not apply between vehicles within the identified group (e.g., when the vehicles are in proximity to one another). For example, in some embodiments, a user may identify (e.g., via the operator interface 48, the user portal 230, the user device 232, and/or the remote systems) one or more vehicles in a group. Each vehicle within the group may be identified based on one or more of a vehicle identification tag (e.g., a VIN), a vehicle identification signal (e.g., an identification friend-or-foe (IFF) signal), or any other suitable identification method. Accordingly, the identification information for each vehicle of the group can be stored and linked together (e.g., within the memory 104, the memory 254, the memory 264) and used to determine whether the automated modification exemption applies to the vehicle 10.

By way of example, if the vehicle 10 is part of an identified group and has a generally applicable automated modification rule that specifies that the volume of the audio system of the vehicle 10 is to be reduced upon detecting that the vehicle 10 is in proximity to another vehicle or other location of interest, the automated modification exemption would allow for the rule to be ignored or otherwise not applied when the vehicle 10 approaches other vehicles within the identified group. That is, if the vehicle 10 approaches and is in proximity to another vehicle in the identified group (and not in proximity to any other locations of interest), the reduced volume rule would not apply to the vehicle 10. However, if the vehicle 10 approaches another vehicle that is outside of the identified group or another location of interest generally, the reduced volume rule would still apply to the vehicle 10. Accordingly, if multiple vehicles in the same group are listening to the same music (e.g., via a synced Bluetooth or other short-range wireless communication connection) or generally do not wish for the volume to be reduced when approaching other vehicles in the same group, the automated modification exemption allows for the volume reduction rule to be ignored between vehicles within the identified group, while still ensuring that proper etiquette is followed with other vehicles and other locations of interest generally.

It should be appreciated that various other types of automated modification exemptions may be set by the user, as desired for a given application. For example, in some embodiments, the user may set a time-based or user-based exemptions to allow for the reduced volume rule to be ignored during certain time periods (e.g., after or before standard operating hours of a golf course) and/or if a vehicle is being used by a particular user (e.g., if the owner or an employee at a golf course is driving the vehicle 10).

If the vehicle control system 100 and/or the remote systems 240 determine that the automated modification exemption applies, at step 404, the vehicle control system 100 and/or the remote systems 240 maintain an auxiliary system function associated with the automated modification at a first or initial state, at step 406. For example, using the reduced volume and identified group example discussed above, if the vehicle 10 approaches another vehicle in the same identified group of vehicles, the automated modification exemption would apply, and the volume of the audio system would remain unchanged.

Alternatively, if the vehicle control system 100 and/or the remote systems 240 determine that the automated modification exemption does not apply, at step 404, the vehicle control system 100 and/or the remote systems 240 modify the auxiliary system function associated with the automated modification from the first or initial state to a second or modified state, at step 408. For example, again using the reduced volume and identified group example discussed above, if the vehicle 10 approaches another vehicle outside of the identified group or another location of interest generally, the automated modification exemption would not apply, and the volume of the audio system would be reduced from a first volume level to a lower second volume level.

In some embodiments, upon automatically adjusting a system function based on an automated modification rule, a notification is provided to a driver or operator of the vehicle 10 (e.g., via the operator interface 48). For example, the notification may indicate what has been adjusted (e.g., "the volume level has been reduced") and/or why the adjustment has been made (e.g., "you are approaching another vehicle outside of your group," "you are approaching the tee box," etc.).

It should be appreciated that, while the description of the method 400 above is provided largely in the context of a golf cart, the method 400 for selectively applying automated function modification to a system of a vehicle can be similarly applied to other vehicles configured to monitor GPS data, network connectivity data, and/or any other similar usage data to that described herein.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf vehicle system comprising:

a golf vehicle including an auxiliary system; and at least one processing circuit having at least one processor and at least one memory, the at least one memory storing instructions thereon that, when executed by the at least one processor, cause the at least one processor to:

detect that the golf vehicle is in proximity to a location of interest associated with an automated modification of a function of the auxiliary system from a first state to a second state;

determine whether an automated modification exemption associated with the automated modification applies to the golf vehicle for the location of interest;

upon detecting that the golf vehicle is in proximity to the location of interest associated with the automated modification and determining that the automated modification exemption applies to the golf vehicle, maintain the function of the auxiliary system in the first state; and upon detecting that the golf vehicle is in proximity to the location of interest associated with the automated modification and determining that the automated modification exemption does not apply to the golf vehicle, modify the function of the auxiliary system from the first state to the second state;

wherein the golf vehicle is a first golf vehicle and the location of interest is a second golf vehicle, and wherein determining whether the automated modification exemption applies to the first golf vehicle for the location of interest includes determining whether the first golf vehicle is linked with the second golf vehicle in a group.

2. The golf vehicle system of claim 1, wherein detecting that the golf vehicle is in proximity to the location of interest is performed based on at least one of global positioning system (GPS) data of the golf vehicle or a geofence associated with the location of interest.

3. The golf vehicle system of claim 1, wherein detecting that the golf vehicle is in proximity to the location of interest is performed based on a short-range wireless communication between the golf vehicle and a device associated with the location of interest.

4. The golf vehicle system of claim 1, wherein the first golf vehicle includes a driveline, and wherein the instructions cause the at least one processor to limit a speed of the driveline upon detection of the second golf vehicle within a certain range of the first golf vehicle.

5. The golf vehicle system of claim 1, wherein the auxiliary system includes an audio system, the function is an audio output of the audio system, the first state is a first volume level of the audio system, and the second state is a second volume level of the audio system.

6. The golf vehicle system of claim 5, wherein the second volume level is lower than the first volume level.

7. The golf vehicle system of claim 1, wherein the auxiliary system is a lighting system, the function is a light output of the lighting system, the first state is a first light intensity level of the lighting system, and the second state is a second light intensity level of the lighting system.

8. The golf vehicle system of claim 1, wherein the instructions cause the at least one processor to receive an indication of the location of interest from a user via a user interface.

9. The golf vehicle system of claim 8, wherein the indication of the location of interest defines a geofence associated with the location of interest.

10. The golf vehicle system of claim 1, wherein the at least one processing circuit includes at least one of a first processing circuit remote from the golf vehicle or a second processing circuit onboard the golf vehicle.

11. A vehicle system comprising:

at least one processing circuit having at least one processor and at least one memory, the at least one memory storing instructions thereon that, when executed by the at least one processor, cause the at least one processor to:

detect that a first vehicle is in proximity to a second vehicle;

determine that the first vehicle qualifies for an automated modification of a function of the first vehicle from a first state to a second state based on detecting that the first vehicle is in proximity to the second vehicle;

determine whether an automated modification exemption associated with the automated modification applies to the first vehicle for the second vehicle;

upon detecting that the first vehicle qualifies for the automated modification and determining that the automated modification exemption applies to the first vehicle, maintain the function in the first state; and upon detecting that the first vehicle qualifies for the automated modification and determining that the automated modification exemption does not apply to the first vehicle, modify the function from the first state to the second state;

wherein determining whether the automated modification exemption applies to the first vehicle for the second vehicle includes determining whether the first vehicle is linked with the second vehicle in a group.

12. The vehicle system of claim 11, wherein detecting that the first vehicle is in proximity to the second vehicle is performed based on at least one of (a) global positioning system (GPS) data of the first vehicle and the second vehicle or (b) a short-range wireless communication between the first vehicle and the second vehicle.

13. The vehicle system of claim 11, wherein the function includes at least one of a speed of the first vehicle, an audio output of an audio system of the first vehicle, or a light intensity of a light system of the first vehicle, and wherein the first state is an elevated state and the second state is a lesser state.

14. A vehicle system comprising:

a non-transitory computer-readable medium having instructions stored thereon that, when executed by one or more processors, cause the one or more processors to:

detect that a golf vehicle is in proximity to a location of interest associated with an automated modification of a function of the golf vehicle from a first state to a second state;

determine whether an automated modification exemption associated with the automated modification applies to the golf vehicle for the location of interest;

upon detecting that the golf vehicle is in proximity to the location of interest associated with the automated modification and determining that the automated modification exemption applies to the golf vehicle, maintain the function in the first state; and upon detecting that the golf vehicle is in proximity to the location of interest associated with the automated modification and determining that the automated modification exemption does not apply to the golf vehicle, modify the function from the first state to the second state;

wherein the golf vehicle is a first golf vehicle and the location on of interest is a second golf vehicle, and wherein determining whether the automated modification exemption applies to the golf vehicle for the location of interest includes determining whether the first golf vehicle is linked with the second golf vehicle in a group.

15. The vehicle system of claim 14, wherein detecting that the golf vehicle is in proximity to the location of interest is performed based on at least one of global positioning system (GPS) data of the golf vehicle, a geofence associated with the location of interest, or a short-range wireless communication between the golf vehicle and a device associated with the location of interest.

* * * * *